US00RE43361E

(19) United States
(12) Reissued Patent
Cardy et al.

(10) Patent Number: US RE43,361 E
(45) Date of Reissued Patent: May 8, 2012

(54) TELECOMMUNICATIONS SYSTEM HAVING SEPARATE SWITCH INTELLIGENCE AND SWITCH FABRIC

(75) Inventors: Douglas R. Cardy, Plano, TX (US); Ken Rambo, San Antonio, TX (US); Carol Waller, Allen, TX (US)

(73) Assignee: MCI Communications Corporation, Basking Ridge, NJ (US)

(21) Appl. No.: 10/054,245

(22) Filed: Jan. 24, 2002
(Under 37 CFR 1.47)

Related U.S. Patent Documents

Reissue of:
(64) Patent No.: 6,041,109
Issued: Mar. 21, 2000
Appl. No.: 08/580,712
Filed: Dec. 29, 1995

(51) Int. Cl.

| | |
|---|---|
| ***H04M 1/64*** | (2006.01) |
| ***H04M 1/00*** | (2006.01) |
| ***H04M 3/42*** | (2006.01) |
| ***H04M 7/00*** | (2006.01) |
| ***H04L 12/50*** | (2006.01) |

(52) U.S. Cl. ..... 379/201.01; 379/69; 379/164; 379/221.01; 379/243; 370/360

(58) Field of Classification Search ..... 379/88.17, 379/221.08–221.11, 219, 88.18, 88.19, 201.01, 379/201.02, 201.03, 201.12, 207.02, 210.02, 379/211.02, 220.01; 370/360
See application file for complete search history.

(56) References Cited

U.S. PATENT DOCUMENTS 4,201,891 A 5/1980 Lawrence et al. ..... 370/361
(Continued)

FOREIGN PATENT DOCUMENTS

| | | |
|---|---|---|
| EP | 0559979 | 9/1993 |
| EP | 0812089 | 12/1997 |
| JP | WO 9529564 | 11/1995 |
| WO | 95/29564 | 11/1995 |
| WO | 96/20448 | 7/1996 |

OTHER PUBLICATIONS

"AINGR: Switch-Service Control Point (SCP)/Adjunct Interface", Bellcore GR-1299-CORE, Issue 4, Revision 1, Oct. 1998, Glossary and Acronyms Sections, 24 pages.

(Continued)

*Primary Examiner* — Joseph T Phan

(57) ABSTRACT

The present invention is a telecommunications system having separate switch fabric and switch intelligence. The system comprises a switch fabric, a switch intelligence, and a feature processor. The switch intelligence is logically separated from the switch fabric and comprises a switch fabric proxy, a facility service, a connection manager service, and a call segment instance service. The switch fabric proxy is coupled to the switch fabric via a vendor-specific first Application Programming Interface (API). The switch fabric proxy supports a second API, which is common across all vendors, representing functions supported by the switch fabric. A facility instance, which is instantiated by a facility service using a facility model, represents the bearer and signaling facilities of a party to a call, and interacts with the switch fabric proxy via the second API to communicate with the switch fabric. The connection manager service represents the connectors for a party to a call, and interacts with the switch fabric proxy via the second API to communicate with the switch fabric. A call segment instance, which is instantiated by a call segment instance service using a call model, represents the call logic and call data for a party to a call, and interacts with the connection manager service via a third API and with the facility instance via a fourth API. The feature processor interacts with the call segment instance via a fifth API to provide the telecommunications feature.

58 Claims, 5 Drawing Sheets

U.S. PATENT DOCUMENTS 4,665,514 A * 5/1987 Ching et al. ..... 370/392
4,685,125 A 8/1987 Zave ..... 700/1
4,713,806 A * 12/1987 Oberlander et al. ..... 370/358
4,747,130 A 5/1988 Ho ..... 379/269
4,821,034 A 4/1989 Anderson et al. ..... 340/222
4,872,157 A 10/1989 Hemmady et al. ..... 370/60
4,872,158 A * 10/1989 Richards ..... 370/380
4,872,159 A * 10/1989 Hemmady et al. ..... 370/352
4,872,160 A * 10/1989 Hemmady et al. ..... 370/353
4,875,206 A * 10/1989 Nichols et al. ..... 370/427
4,893,302 A * 1/1990 Hemmady et al. ..... 370/427
4,894,824 A * 1/1990 Hemmady et al. ..... 370/380
4,896,319 A * 1/1990 Lidinsky et al. ..... 370/427
4,899,333 A * 2/1990 Roediger ..... 370/427
4,922,486 A * 5/1990 Lidinsky et al. ..... 370/427
4,942,574 A * 7/1990 Zelle ..... 370/400
4,958,341 A * 9/1990 Hemmady et al. ..... 370/352
4,977,582 A * 12/1990 Nichols et al. ..... 375/371
4,979,118 A * 12/1990 Kheradpir ..... 701/117
5,042,027 A 8/1991 Takase et al.
5,157,390 A 10/1992 Yoshie et al. ..... 340/825
5,195,085 A 3/1993 Bertsch et al. ..... 370/250
5,226,075 A 7/1993 Funk et al. ..... 379/243
5,272,749 A 12/1993 Masek ..... 379/216
5,327,486 A 7/1994 Wolff et al. ..... 379/96
5,329,520 A 7/1994 Richardson ..... 370/16
5,390,335 A 2/1995 Stephan et al. ..... 709/221
5,418,844 A 5/1995 Morrisey et al. ..... 379/207
5,422,940 A 6/1995 Endo et al. ..... 379/207
5,434,852 A * 7/1995 La Porta et al. ..... 379/157
5,436,893 A * 7/1995 Barnett ..... 370/392
5,455,821 A 10/1995 Schaefer et al. ..... 370/332
5,469,500 A * 11/1995 Satter et al. ..... 379/201.05
5,475,817 A 12/1995 Waldo et al. ..... 395/650
5,483,585 A 1/1996 Parker et al. ..... 379/216.01
5,513,127 A 4/1996 Gard et al. ..... 709/223
5,519,768 A * 5/1996 Moquin et al. ..... 379/100.01
5,526,415 A 6/1996 Wakamoto
5,530,852 A 6/1996 Meske, Jr. et al. ..... 395/600
5,548,726 A 8/1996 Pettus ..... 395/200.09
5,551,035 A 8/1996 Arnold et al. ..... 395/650
5,572,581 A * 11/1996 Sattar et al. ..... 379/201.05
5,572,583 A * 11/1996 Wheeler, Jr. et al. ..... 379/207
5,583,920 A * 12/1996 Wheeler, Jr. ..... 379/88.01
5,603,085 A 2/1997 Shedlo ..... 455/450
5,608,446 A 3/1997 Carr et al. ..... 348/6
5,610,976 A 3/1997 Uota et al. ..... 379/127
5,619,557 A 4/1997 Van Berkum ..... 379/88
5,619,562 A 4/1997 Maurer et al. ..... 379/201
5,644,631 A * 7/1997 Sattar et al. ..... 379/201.05
5,655,007 A * 8/1997 McAllister ..... 379/91.01
5,661,782 A 8/1997 Bartholomew et al. ..... 379/67
5,664,102 A 9/1997 Faynberg ..... 395/200
5,677,905 A * 10/1997 Bigham et al. ..... 370/395.21
5,694,463 A 12/1997 Christie et al. ..... 379/221.09
5,701,412 A * 12/1997 Takeda et al. ..... 379/221.09
5,703,940 A * 12/1997 Sattar et al. ..... 379/201.05
5,712,903 A * 1/1998 Bartholomew et al. .... 379/88.25
5,712,906 A 1/1998 Grady et al.
5,712,908 A 1/1998 Brinkman et al. ..... 379/119
5,715,304 A 2/1998 Nishida et al.
5,724,406 A 3/1998 Juster ..... 379/88.13
5,724,419 A 3/1998 Harbuziuk et al. ..... 379/266.04
5,740,075 A * 4/1998 Bigham et al. ..... 709/229
5,742,905 A 4/1998 Pepe et al. ..... 455/461
5,748,468 A 5/1998 Notenboom et al. ..... 700/3
5,761,290 A * 6/1998 Farris et al. ..... 379/207
5,781,624 A 7/1998 Mitra et al. ..... 379/244
5,784,617 A 7/1998 Greenstein et al. ..... 395/674
5,787,160 A 7/1998 Chaney et al. ..... 379/112.06
5,802,157 A 9/1998 Clarke et al. ..... 379/196
5,812,533 A 9/1998 Cox et al. ..... 379/259
5,818,921 A 10/1998 Vander Meiden et al. .... 379/225
5,822,419 A * 10/1998 Enstone et al. ..... 379/201.03
5,822,727 A * 10/1998 Garberg et al. ..... 379/88.16
5,825,869 A 10/1998 Brooks et al. ..... 379/265.12
5,826,268 A 10/1998 Schaefer et al. ..... 707/9
5,838,970 A 11/1998 Thomas ..... 719/316
5,848,143 A 12/1998 Andrews et al. ..... 379/265.09
5,867,498 A * 2/1999 Gillman et al. ..... 370/385
5,867,565 A * 2/1999 Morikawa ..... 379/112.06
5,878,128 A * 3/1999 Kantola ..... 379/230
5,881,134 A 3/1999 Foster et al. ..... 379/88.01
5,903,641 A 5/1999 Tonisson
5,915,008 A 6/1999 Dulman ..... 379/221.08
5,940,378 A * 8/1999 Ushiki et al. ..... 370/259
5,940,487 A * 8/1999 Bunch et al. ..... 379/201.03
5,940,616 A 8/1999 Wang ..... 717/127
5,958,016 A 9/1999 Chang et al. ..... 709/229
5,960,205 A * 9/1999 Mao et al. ..... 717/170
5,966,434 A 10/1999 Schafer et al. ..... 379/201.01
5,995,610 A * 11/1999 Smidt et al. ..... 379/207.02
6,018,567 A 1/2000 Dulman ..... 379/32.03
6,035,028 A 3/2000 Ward et al. ..... 379/201.02
6,041,109 A * 3/2000 Cardy et al. ..... 379/201.01
6,041,117 A 3/2000 Androski et al. ..... 379/201
6,044,142 A * 3/2000 Hammarstrom et al. ..... 379/223
6,049,545 A 4/2000 Stephenson et al. ..... 370/410
6,094,479 A * 7/2000 Lindeberg et al. ..... 379/220.01
6,098,094 A 8/2000 Barnhouse et al. ..... 709/203
6,104,803 A 8/2000 Weser et al. ..... 379/230
6,134,433 A 10/2000 Joong et al. ..... 455/417
6,144,647 A 11/2000 Lopez-Torres ..... 370/329
6,161,128 A 12/2000 Smyk ..... 709/205
6,169,735 B1 1/2001 Allen, Jr. et al. ..... 370/352
6,175,618 B1 1/2001 Shah et al. ..... 379/207.13
6,181,703 B1 * 1/2001 Christie et al. ..... 370/410
6,208,724 B1 * 3/2001 Fritzinger et al. ..... 379/201.01
6,222,919 B1 4/2001 Hollatz et al.
6,243,453 B1 * 6/2001 Bunch et al. ..... 379/201.01
6,243,455 B1 * 6/2001 Tuunanen ..... 379/219
6,301,350 B1 10/2001 Henningson et al. .... 379/220.01
6,324,275 B1 * 11/2001 Yagel et al. ..... 379/201.03
6,327,355 B1 * 12/2001 Britt ..... 379/201.03
6,333,980 B1 12/2001 Hollatz et al.
6,373,825 B1 * 4/2002 Fuchs et al. ..... 370/255
6,480,890 B1 11/2002 Lee et al. ..... 709/223
6,581,095 B1 * 6/2003 Kim ..... 709/220
6,690,781 B2 * 2/2004 Creamer et al. ..... 379/201.12
6,690,788 B1 2/2004 Bauer et al. ..... 379/242
6,694,002 B2 * 2/2004 Creamer et al. ..... 379/201.12
6,704,410 B1 3/2004 McFarlane et al. ..... 379/265.05
6,721,409 B1 * 4/2004 Dell et al. ..... 379/202.01
6,724,875 B1 * 4/2004 Adams et al. ..... 379/201.01
6,871,346 B1 * 3/2005 Kumbalimutt et al. ..... 718/104
6,873,698 B1 * 3/2005 Pearson et al. ..... 379/221.08
7,133,515 B1 * 11/2006 Cook ..... 379/208.01
7,151,935 B2 * 12/2006 Shang et al. ..... 455/445
7,280,530 B2 * 10/2007 Chang et al. ..... 370/352
7,359,503 B2 4/2008 Porter et al.
7,461,381 B2 * 12/2008 Adams et al. ..... 719/316
7,596,215 B2 * 9/2009 Vance et al. ..... 379/202.01
7,756,261 B2 * 7/2010 Porter et al. ..... 379/201.12
7,934,206 B2 * 4/2011 Butler et al. ..... 717/140
7,979,518 B2 * 7/2011 Barnhouse et al. ..... 709/223

OTHER PUBLICATIONS

"Intelligent Network (IN)", The International Engineering Consortium, Web ProForum Tutorials, http:://www.iec.org, Sep. 6, 2000, pp. 1-32.

Elixmann et al., "Open Switching-Extending Control Architectures to Facilitate Applications," International Switching Symposium, vol. 2, Apr. 23-28, 1995, Berlin, Germany, pp. 239-243.

Kabay et al., "The Service Node—An Advanced in Services Element," BT Technology Journal, vol. 13, No. 2, Apr. 1995, Ipswich, Great Britain, pp. 64-72.

Mayer et al., "Service Net-2000: An Intelligent Network Evolution," AT&T Technical Journal, vol. 70, No. 3/4, 1991, Short Hills, USA, pp. 99-110.

Maruyama, "A Concurrent Object-Oriented Switching Program in Chill," IEEE Communications Magazine, vol. 29, No. I, Jan. 1991, New York, USA, pp. 60-68.

Shabana et al., "Intelligent Switch Architecture," Proceedings of the National Communications Forum, vol. 42, No. 2, Sep. 30,1988, Chicago, USA, pp. 1312-1320.

* cited by examiner

TELECOMMUNICATIONS SYSTEM HAVING SEPARATE SWITCH INTELLIGENCE AND SWITCH FABRIC

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to network switching and more particularly to a telecommunications system having separate switch intelligence and switch fabric.

2. Related Art

A conventional telecommunications network comprises three basic components: user terminals (e.g., telephones), communications busses (e.g., telephone lines) and switches. The switches are used to selectively connect the user terminals via the communications busses. Each switch comprises two basic components: the switch fabric, which physically interconnects the communications busses, and the switch intelligence, which directs the operation of the switch fabric based on control signals (e.g., telephone numbers) received by the switch.

In recent years, however, the telecommunications features offered by service providers (including both local and long distance service providers) have increased dramatically in both number and complexity. Because many of these features are implemented primarily at the switch, the complexity of the switch intelligence has increased in kind to include complex call processing logic. Despite the dual nature of the switch, standard telecommunications architectures such as Advanced Intelligent Network (AIN) and SS7 have continued to incorporate both switch intelligence and switch fabric into a single device. The retention of this monolithic switching approach in the face of these changes has substantial disadvantages.

The primary disadvantages result from the fact that switches from different manufacturers may employ unique methods of control and/or unique computing languages in their switches. Thus when a service provider offers a new feature requiring a change in switch intelligence, the change must be implemented by the switch vendor. In a network comprising switches from several manufacturers, these changes must be coordinated to ensure a coincident release of the new feature at all switches. Further, each switch vendor must implement a switch change required by one service provider without disturbing the switch intelligence aspects required by other service providers. Finally, changes cannot be implemented centrally, but must be implemented separately at each switch. This arrangement requires substantial lead time for a change, typically on the order of two years or more.

What is needed, therefore, is a telecommunications network where the switch intelligence is separated from the switch fabric.

SUMMARY OF THE INVENTION

The present invention is a telecommunications network having separate switch fabric and switch intelligence. The system comprises a switch fabric, a switch intelligence, and a feature processor. The switch intelligence is logically separated from the switch fabric and comprises a switch fabric proxy, a facility service, a connection manager service, and a call segment instance service. The switch fabric proxy is coupled to the switch fabric via a vendor-specific first Application Programming Interface (API). The switch fabric proxy supports a second API, which is common across all vendors, representing functions supported by the switch fabric. A facility instance, which is instantiated by a facility service using a facility model, represents the bearer and signaling facilities of a party to a call, and interacts with the switch fabric proxy via the second API to communicate with the switch fabric. The connection manager service represents the connectors for a party to a call, and interacts with the switch fabric proxy via the second API to communicate with the switch fabric. A call segment instance, which is instantiated by a call segment instance service using a call model, represents the call logic and call data for a party to a call, and interacts with the connection manager service via a third API and with the facility instance via a fourth API. The feature processor interacts with the call segment instance via a fifth API to provide the telecommunications feature.

The switch intelligence further comprises two call processing creation environments. The first, called a call model creation environment, is employed to access the call segment instance service via a programming API to modify existing call models and to create new call models. The second call processing creation environment is employed to access the facility service via a programming API to modify existing facility models and to created new facility models.

One advantage of the present invention is to facilitate rapid creation and deployment of new telecommunications features.

Another advantage of the present invention is to allow software and hardware components to be reused across multiple features and products.

Another advantage of the present invention is to permit scalability both at the processor level and at the level of the communications infrastructure.

Another advantage of the present invention is to provide an architecture that is reusable across future switch and port infrastructures (for example, broadband).

Another advantage of the present invention is to provide an infrastructure that supports the ability to engineer applications in varying levels of centralization or distribution, based on usage.

Another advantage of the present invention is to define a call processing environment in which buy/build decision can be made on major components of the call processing system, including facilities, signaling, and call data processing.

Another advantage of the present invention is to define a call processing environment in which the price/performance decisions of the switch call processing and switch hardware capabilities are decoupled, resulting in an optimized business buying strategy.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

I. Introduction

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

II. The Intelligent Distributed Network Architecture

As used herein, the Intelligent Distributed Network Architecture (IDNA) defines the infrastructure and network elements of an advanced switching system. The term network element (NE) is used herein to describe any physical device within the IDNA. An NE within the IDNA is named according to its primary function. Therefore, an NE that performs primarily switch intelligence functions is named a Switch Intelligence Network Element (SI-NE). A functional entity (such as switch intelligence) may be split across multiple NEs, in which case all of the NEs are denoted by their primary functions (such as SI-NE).

Figure 1:
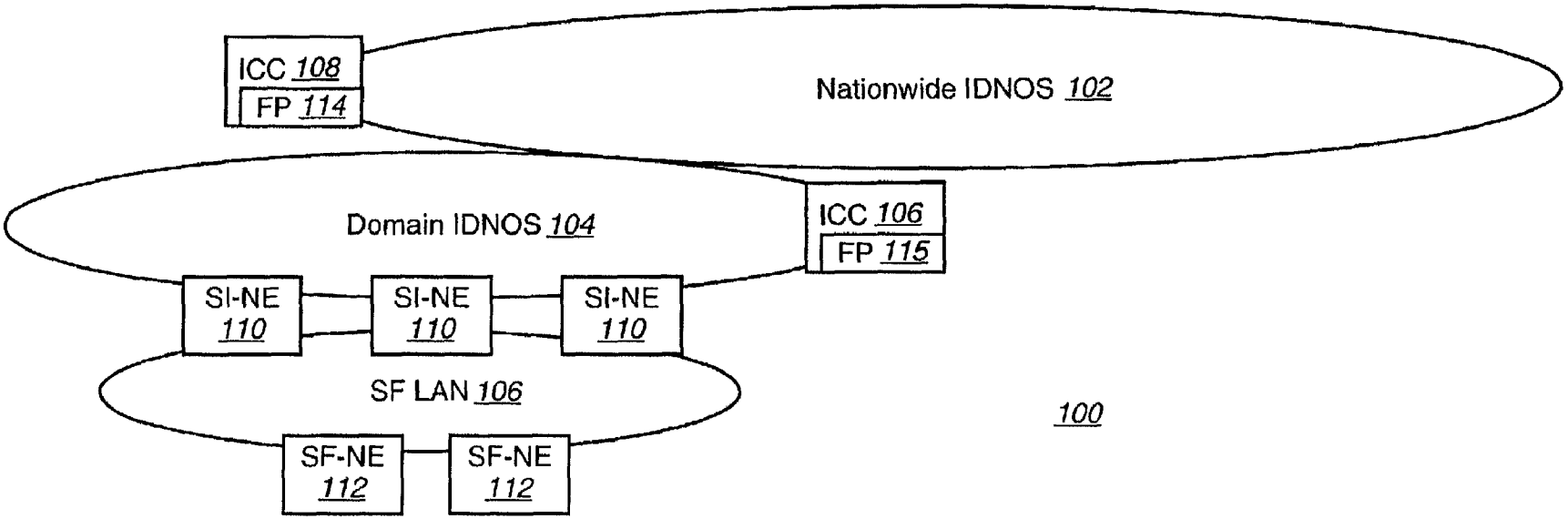
FIG. 1 is a network block diagram depicting the major components of a network according to a preferred embodiment of the present invention.

FIG. 1 is a network block diagram depicting the major components of a network according to a preferred embodiment of the present invention. Referring to FIG. 1, network 100 comprises a Nationwide Intelligent Distributed Network Operating System (IDNOS) 102 and a plurality of Domain IDNOS 104 (only one Domain IDNOS 104 is shown). IDNOS 104 is the infrastructure supporting the communications, execution, and maintenance of processes within network 100. IDNOS is essentially similar in nature to DCE client/server application environments or CORBA distributed object execution environments.

Each Domain IDNOS 104 is coupled to Nationwide IDNOS 102 and at least one Intelligent Computing Complex (ICC) 108. ICC 108 is a computing element that provides services to control the calls processed by Switch Intelligence NEs 110. Each ICC 108 comprises at least one Feature Processor 114. Feature Processor 114 is the functional entity which contains all IN-style logic associated with call processing. This logic is all logic which controls advanced call services and call structure, and may overlap the logic of Switch Intelligence NE 110 in areas where rapid service creation has forced this structure. Feature Processor 114 is usually thought of as comprising all logic not associated with either signaling or call models.

Each Domain IDNOS 104 supports a switching function comprising at least one Switch Intelligence NE 110 coupled to at least one Switch Fabric NE 112. Switch Intelligence NEs 110 are the elements of network 100 that provide call processing functions to manage and process the facilities provided by Switch Fabric NEs 112. Switch Intelligence NE 110 contains all aspects of data processing required to complete a simple bearer connectivity request, as well as all logic required to determine points in call where feature involvement is required. Switch Intelligence NE 110 can be a general-purpose computer, such as a Sun or HP Workstation.

Switch Fabric NE 112 is the element of network 100 that provides the physical facilities necessary to complete a call. These resources include, but are not limited to, bearer devices (T1's, DS0's), network matrix devices (network planes and their processors), link layer signal processors (SS7 MTP, ISDN LAPD), and specialized circuits (conference ports, audio-tone-detectors). Switch Fabric NE 112 represents the hardware switch component provided by a switch manufacturer, such as Nortel.

In a preferred embodiment, network 100 is implemented as a client-server system using functional application programming interfaces (APIs) defined for each service. For example, if an application running on a SI-NE 110 requires a service provided by a FP 114, the SI-NE 110 acts as a client to request the service via an API, and the FP 114 acts as a server to provide the service. Conversely, if an application running on a FP 114 requires a service provided by a SI-NE 110, the FP 114 acts as a client to request the service via an API, and the SI-NE 110 acts as a server to provide the service.

Each call to a server is made through these APIs, regardless of the geographic separation between the client and server. IDNOS 102 allows the client and server to be separated geographically across IDNOS-compatible interfaces and provides a remote procedure call (RPC) capability that is transparent to the client and the server. Thus, applications can be designed as though both client and server were in the same processor, independent of the actual underlying RPC mechanism. Thus, the present invention provides location transparency.

This functional interface method is substantially different from the message-based interfaces provided by traditional IN architectures. These interfaces typically assume a specific distribution topology, and require an underlying infra-structure that is inherently tied to a particular communications method (CCS7, MTP, etc.). The RPC-based approach employed in network 100 allows the underlying communications method to be evolved independently of the design of upper-layer clients and servers.

The RPC client-server model is restricted to interfaces at the service level. Interfaces within the actual servers (between components of the server) are vendor-proprietary, and are not subject to this specification.

In one embodiment, the present invention is implemented as computer software embedded in a computer usable medium as computer readable program code means. The computer usable medium can be, for example, a hard disk drive or a removable storage medium such as a floppy disk.

A. IDNA Services

Figure 2:
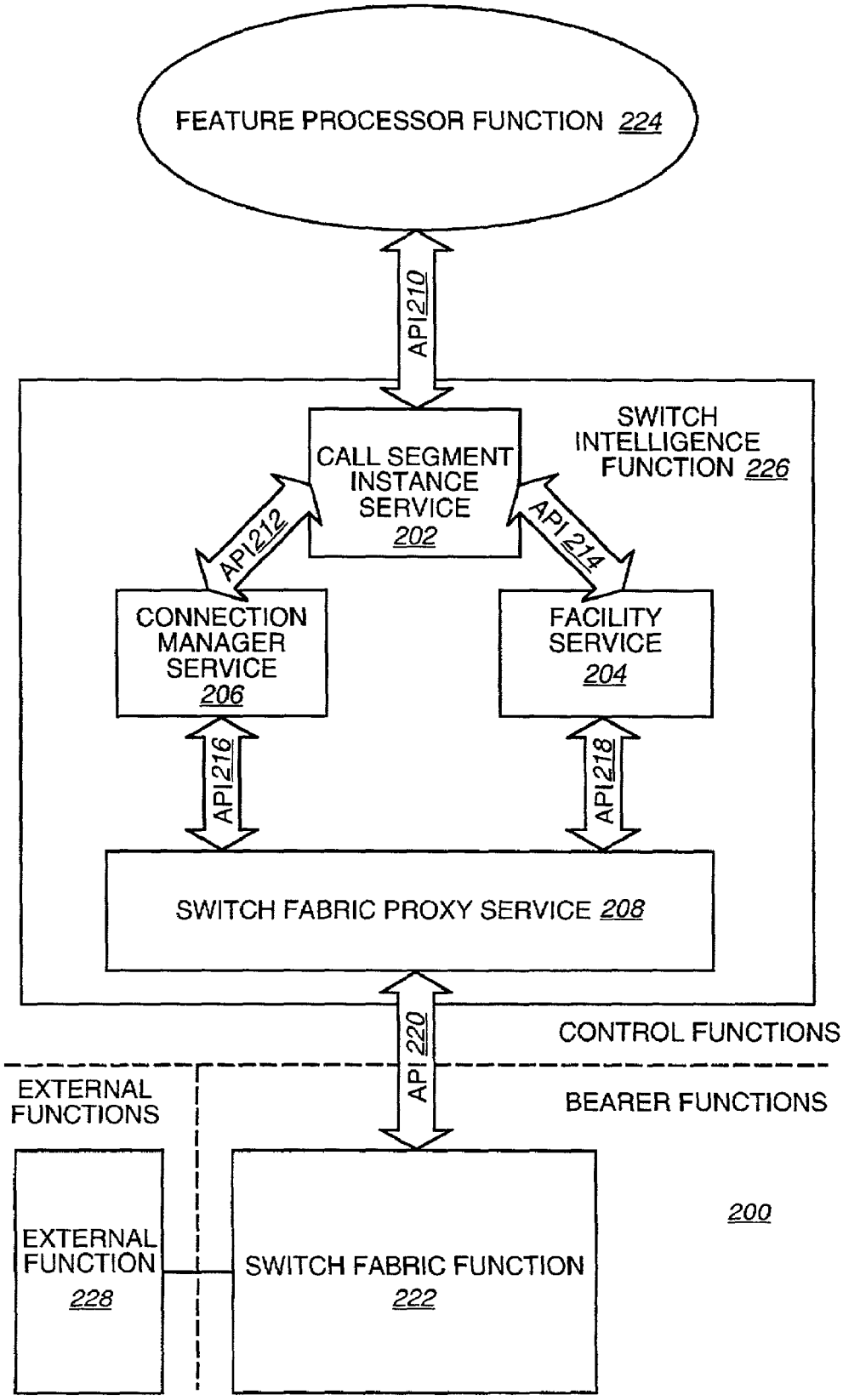
FIG. 2 is a functional block diagram of a switch node embodying a switching function according to a preferred embodiment of the present invention.

FIG. 2 is a functional block diagram of a Switch Node 200 embodying a switching function according to a preferred embodiment of the present invention. This functional view can be thought of as a cross-section of network 100 that shows how the switching functions deployed onto network elements interact to provide telecommunications features according to a preferred embodiment of the present invention. Switch Node 200 is a logical entity implemented as functions which are executed by the physical network elements depicted in FIG. 1. Each function may be provided by one or more NEs. For example, Switch Fabric Function 222 may be provided by one Switch Fabric NE 112, or may be distributed over two or more Switch Fabric NEs 112.

For clarity, the depiction of Switch Node 200 is divided into bearer functions and control functions. The control functions comprise Feature Processor Function 224 and Switch Intelligence Function 226. Switch Intelligence Function 226 further comprises Call Segment Instance Service 202, Facility Service 204, Switch Fabric Proxy Service 208, and Connection Manager Service 206. The bearer functions comprise Switch Fabric Function 222. For ease of explanation, FIG. 2 also depicts external functions comprising External Function 228 (for example, a PBX function).

Switch Fabric Proxy Service 208 is a device driver preferably supplied by the manufacturer of the Switch Fabric NE(s) executing Switch Fabric Function 222. Switch Fabric Proxy Service 208 provides Connection Manager Service 206 and Facility Service 204 with a common interface to Switch Fabric Function 222 and a common view of the services provided by Switch Fabric Function 222.

In a preferred embodiment, the interface between Switch Fabric Proxy Service 208 and Switch Fabric Function 222 is a vendor-specific ATM interface, and the interface between Call Segment Instance Service 202 and Facility Service 204 is an ISDN variant Q.931.

Call Segment Instance Service 202 is the process which actually brings up and takes down individual connections to complete a call. Facility Service 204 is a protocol state machine that provides all data processing related to the physical resources (that is, facilities) involved in a call. As discussed below, Call Segment Instance Service 202 and Facility Service 204 are programmable to generate a call model which provides a run-time environment for Feature Processor Function 224 to establish calls.

Connection Manager Service 206 rationalizes abstract connection requests from Call Segment Instance Service 202 and resolves these requests into physical connection requests to Switch Fabric Function 222. For example, Connection Manager Service 206 will receive a request to make a particular connection, and translate this request into a request to Switch Fabric Function 222 to physically connect two particular ports.

Services 202, 204, and 206 are not instances, but rather monolithic services which maintain instances within themselves to establish a particular call segment. Each of the services described herein fulfills the interfaces described within this specification using specific procedures. However, as will be apparent to one skilled in the relevant art, other procedures will satisfy the interfaces described, so long as all of the API-specified interfaces are satisfied.

As stated above, the switching function is divided into two primary functions: Switch Intelligence Function 226 and Switch Fabric Function 222. These two functions cooperate in a client/server relationship to complete requests for bearer connectivity (e.g., phone calls). A fundamental conceptual distinction between Switch Intelligence Function 226 and Switch Fabric Function 222 is the assignment of data and devices. All devices necessary to complete a bearer connectivity, including trunk cards, switch matrix networks, specialized circuitry, and link processor cards, are assigned to Switch Fabric Function 222. All data (i.e., processing of information) from these devices, including the processing of signaling, call state, and feature request information, is assigned to Switch Intelligence Function 226.

As stated above, Switch Intelligence Function 226 and Switch Fabric Function 222 correspond logically to two physical computing devices called Network Elements (NEs). Switch Intelligence Function 226 resides within one or more Switch Intelligence NEs (SI-NEs) 110, whereas Switch Fabric Function 222 resides within one or more Switch Fabric NEs (SF-NEs) 112.

Communication between these SF-NEs and SI-NEs is performed using an interface which is preferably supplied by the manufacturer of the Switch Fabric Function 222. This interface consists of Switch Fabric Proxy Service 208 and API 220. Switch Fabric Proxy Service 208 is a software element, usually residing on an SI-NE, which provides a normalized interface to the functional elements of Switch Intelligence Function 226. Switch Fabric Proxy Service 208 permits SF-NE vendors to use any control interface between an SF-NE and Switch Fabric Proxy Service 208 (API 220), but forces SF-NE vendors to provide a uniform interface from Switch Fabric Proxy Service 208 to Switch Intelligence Function 226 (APIs 216 and 218). Requests flow between Switch Intelligence Function 226 and Switch Fabric Proxy Service 208 as API procedure calls and responses defined by APIs 216 and 218. As will be apparent to one skilled in the relevant art, APIs 216 and 218 can be considered to be two portions, perhaps overlapping, of a single API.

1. The IDNA Call Model

Figure 3:
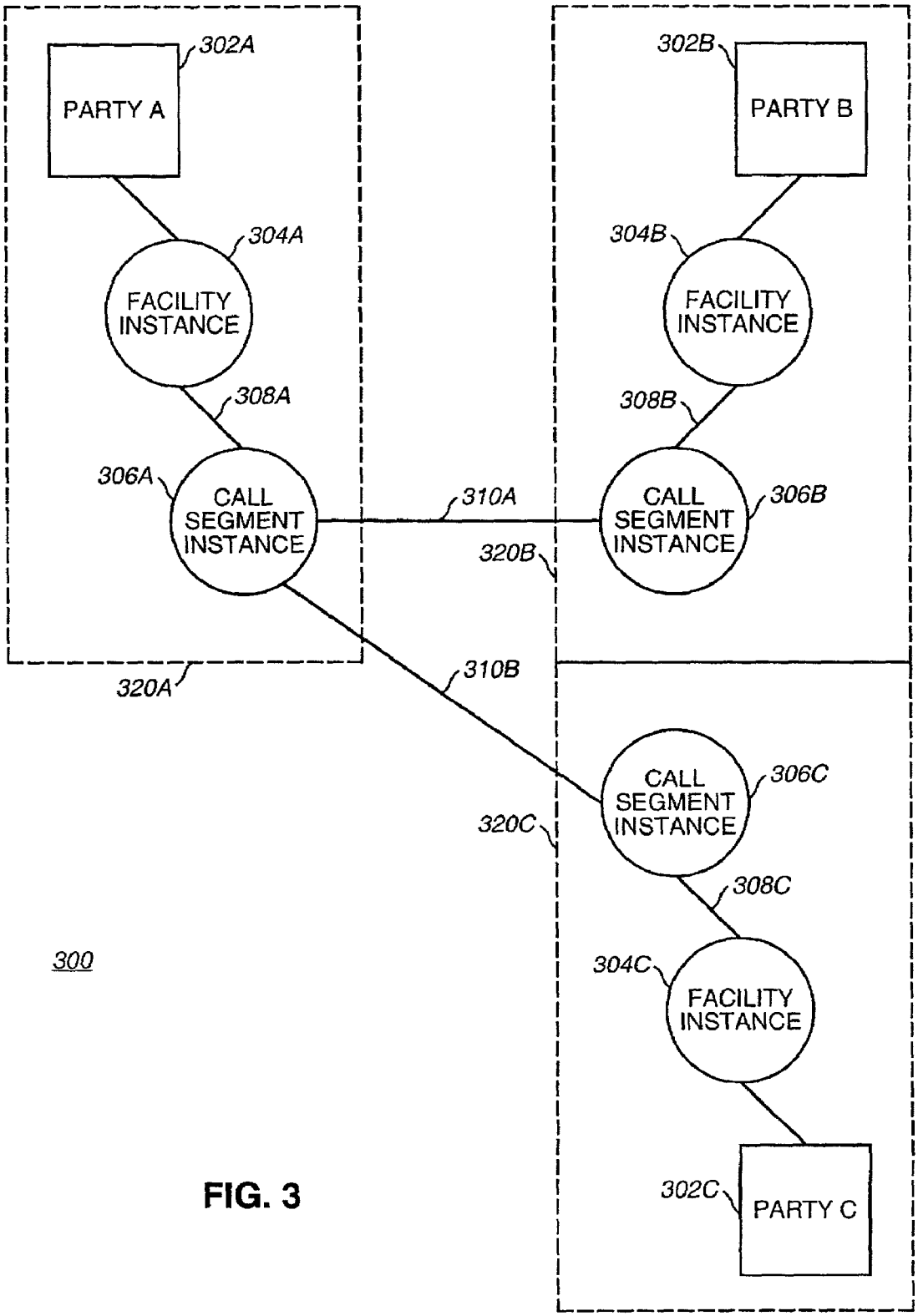
FIG. 3 is an object view of a three-way call as an instance of the call model according to a preferred embodiment of the present invention.

The IDNA call model is a method of representing the bearer, signaling, and call processing facilities associated with a call. FIG. 3 is an object view of a three-way call 300 as an instance of the call model according to a preferred embodiment of the present invention. The call model described in this specification is based on several fundamental concepts.

A call is composed of a number of participating members, one for each party to a call; each member is known as a "call half." A call half provides all control for the facilities, subscribers, databases, and call states for the participating member. Call 300 comprises three parties 302A-C, and thus three call halves 320A-C.

Each call half 320 is composed of two primary elements: Call Segment Instance 306 and Facility Instance 304. Call Segment Instance 306 is an instance of Call Segment Instance 202. Call Segment Instance 306 supports the data and interfaces required for call state, subscriber, and feature processing. Call Segment Instance 306 represents the processing of an endpoint in a call. Facility Instance 304 is an instance of Facility Service 204. Facility Instance 304 supports the processing of events on a facility and correlates these events into requests to Call Segment Instance 306.

The processing of data related to physical facilities, contained within Facility Instance 304, is isolated from the actual physical facilities contained within Switch Fabric NE 112 (represented by Switch Fabric Proxy Service 208). Switch Fabric NE 112 provides minimal data processing capabilities.

Figure 4:
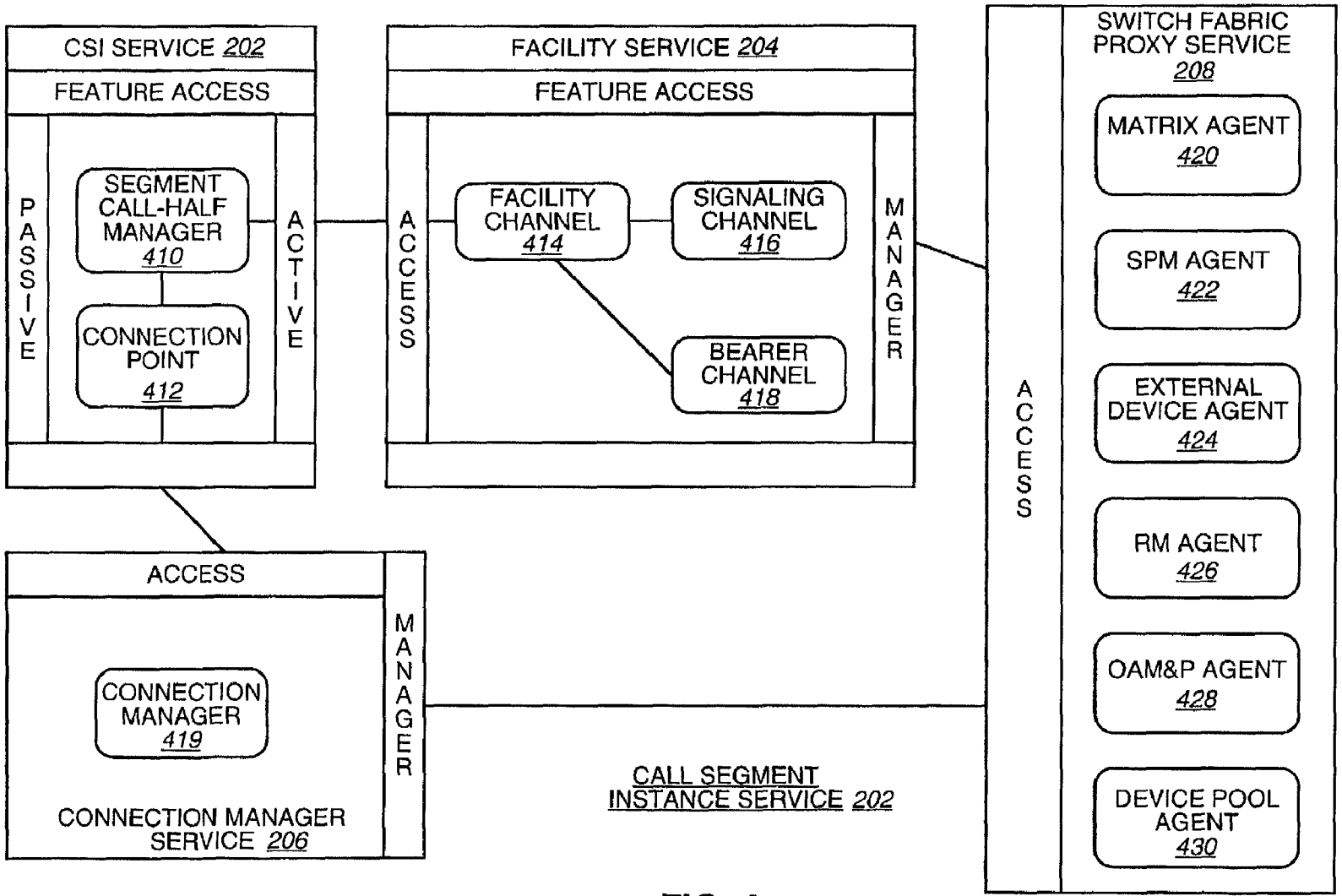
FIG. 4 is an object view of the conceptual elements contained within the services according to the present invention.

FIG. 4 is an object view of the conceptual elements contained within the services according to the present invention. In the following discussion, a distinction is drawn between services, which are real and defined, and conceptual entities, which are provided for illustrative purposes only.

The following paragraphs define the services of Switch Intelligence Function 226 according to a preferred embodiment of the present invention, as well as the conceptual entities contained within these services, with reference to FIG. 3.

2. The Call Segment Instance Service

Call Segment Instance Service 202 is the IDNOS service that performs call half processing, and is the entity that represents the status of call half 302, including all connection points and associated resources. Call Segment Instance Service 202 communicates to Facility Service 204 (for protocol processing), to Feature Processor Function 224 (for feature processing), and to Connection Manager 206 (for connection control). Call Segment Instance Service 202 corresponds to the AIN 1.0 Call Segment (CS) object.

Call Segment Instance Service 202 is provided via a Call Segment Instance 306 that is specifically associated with a particular active facility at a particular call state. Identical active facilities with different call states are considered different Call Segment Instances 306.

Call Segment Instance Service 202 comprises two conceptual entities: Connection Point (CP) Conceptual Entity 412 and Segment Call-Half Manager Conceptual Entity 410.

Connection Point (CP) Conceptual Entity 412 is the entity aware of the connectivity of connectors within a Call Segment Instance 306. A CP 412 is a representation of connectors in some state of bearer connectivity (one-way, two-way, multi-way, etc.). Multiple CPs 412 within a call are not in a state of bearer connectivity, but may be either brought into connectivity by joining them. A CP 412 may be removed from a state of bearer connectivity by splitting it.

CP 412 maintains information relevant to the status of a call half's connectors; as such, no state machine is needed to provide that capability. A connector represents the connection between two (or more) connection points. A connector may be either an active connector or a passive connector. An active connector is any connector between a Call Segment Instance 306 and a Facility Instance 304; a Call Segment Instance 306 can have only one active connector. A passive connector is any connector between two Call Segment Instances 306. A CP can have a maximum of one active connector, but can have any number of passive connectors. However, a CP does not require an active connector; a CP may represent a connection of two passive connectors (for example, a call on hold with music). Since CPs are not required to have an active connector, there may be a situation where segments are not managing actual facilities, but are instead managing the connection between other segments. If a segment were placed in such a situation, it would represent and control the relationship between two end-point segments.

Segment Call-Half Manager Conceptual Entity 410 represents the call data processing within a segment. The primary aspect of Segment Call-Half Manager 410 is a Call State Machine, which is a finite state machine responsible for the execution of basic call processing. This object is the state machine typically associated with call processing within ITU standards.

3. The Facility Service

Facility Service 204 is a protocol state machine which provides all data processing related to the physical resources (i.e., facilities) involved in a call. Facility Service 204 processes raw signaling data provided by Switch Fabric Proxy Service 208. The resulting actions describe detailed call progress changes that initiate abstract call progress changes (which are given to Call Segment Instance 306). Information provided to Facility Service 204 by Switch Fabric Proxy Service 208 is usually formed of facility-related events (on-hook, off-hook, wink) and actual data received (DTMF digits, ISUP messages, Q.931 messages) from the facility. Switch Fabric Proxy Service 208 provides this information in an unprocessed form, allowing Facility Service 204 to process this data into abstract events for Call Segment Instance 306 (e.g., Call Setup Request, Call Disconnect Request, etc.).

Facility Service 204 also acts as a server to the Call Segment Instance Service 202, fulfilling requests for facility manipulation. This manipulation is received as abstract requests (e.g., Provide Tone, Setup Request, Disconnect) and causes the facility to perform actions on the Switch Fabric Proxy Service to fulfill the manipulation requests. The majority of the APIs defined for Facility Service 204 that are provided to Call Segment Instance Service 202 are not protocol-specific. Rather, these requests are abstract interfaces that span all protocol families and yield protocol-specific actions based on logic contained entirely within Facility Service 204.

Facility Service 204 comprises Facility Channel Conceptual Entity 414, Signaling Channel Conceptual Entity 416, and Bearer Channel Conceptual Entity 418.

Facility Channel (FCH) Conceptual Entity 414 is a functional component which provides the ability to logically "bind" a bearer channel to its associated signaling. This binding happens on indication from the Signaling Channel that a Bearer Channel is required for the call.

Signaling Channel (SCH) Conceptual Entity 416 is the object that addresses all of those aspects of FCH 414 associated with communications with distant SF-NEs 112 and SI-NEs 110. SCH 416 takes care of the signaling for a call half. It is minimally available in three flavors: SS7 ISUP, PRI, and inband. SCH 416 is where new types of signaling are implemented (for example, BTUP or R2).

Bearer Channel (BCH) Conceptual Entity 418 provides an association between a Call Segment Instance 306 and the set of physical devices associated with providing bearer services for that Call Segment Instance 306. These physical devices include T1s, E1s, DS0s, and other bearer devices, but exclude any device strictly associated with signaling. This association permits invoking entities to refer to these devices in an abstract command structure, eliminating the need to refer to all devices within the association. There is one BCH 418 associated with each FCH 414. However, BCH 418 may represent a group of circuits; for example, a 6×64 wideband call would have six circuits actually involved but would be represented as one BCH 418.

4. The Connection Manager Service

Connection Manager Service 206 provides the ability to establish and track connections within an SF-NE 112. Connection Manager Service 206 rationalizes abstract connection requests from Call Segment Instance Service 202 and resolves these requests into physical connection requests for Switch Fabric Function 222. For example, Connection Manager Service 206 will receive a request to make a particular connection, and translate this request into a request to physically connect two particular ports. Connection Manager Service 206 will minimally receive connection instructions from each Call Segment Instance 306, and will resolve these instructions into specific matrix actions for Switch Fabric Function 222 which connect the devices controlled by each segment. A very basic call will result in two segments which provide data to Connection Manager Service 206, which then resolves this data into a single connection request to Switch Fabric Proxy Service 208.

5. The Switch Fabric Proxy Service

Switch Fabric Proxy Service 208 provides all mechanisms to control Switch Fabric Function 222 bearer and connectivity resources. It is the fundamental aspect of Switch Fabric Service 112 that it provides clients, such as Call Segment Instance 306, the ability to associate bearer resources and to request connectivity of resources.

Switch Fabric Proxy Service 208 provides IDNOS-compatible APIs 216 and 218 towards the remainder of call processing, and provides Switch Fabric-specific API 220 towards the actual switch fabric equipment (SF-NEs 112). As such, Switch Fabric Proxy Service 208 acts as a gateway between the IDNOS client/server environment and the Switch Fabric-specific messaging environment. Switch Fabric Proxy Service 208 is required to be accessible through the IDNOS RPC execution support capability, whereas SF-NEs 112 are not required to be accessible through the IDNOS RPC. It is acceptable to have the Switch Fabric Proxy Service 208 built within an SF-NE 112, but such a configuration would require an IDNOS-compliant physical interface between the SF-NE 112 and communicating SI-NEs 110.

Switch Fabric Proxy Service 208 provides interfaces to the call processing clients that deal with device connectivity, signaling, etc. These interfaces (also called "agents") are grouped into the conceptual entities described below.

Signal Protocol Manager (SPM) Conceptual Entity 422 is a distributor of signaling information to the various Signaling Channels which process such information. SPM 422 is capable of rudimentary processing of signaling information and may combine multiple events into a single Signaling Channel indication (under the guidance of Signaling Channel 416).

Matrix Conceptual Entity 420 is the functional component responsible for interconnection of compatible bearer channels, enabling the transfer of information between bearer channels on facilities external to SF-NE 112. Matrix 420 performs its functions under the control of Connection Manager 419 within SI-NE 112.

External Device Conceptual Entity 424 is the functional component that comprises all physical interfaces external to SF-NE 112. These external interfaces may provide bearer transport, data transport, or a mixture of bearer and data transport. External Device Conceptual Entity 424 also encompasses those devices that provide service circuit-typed capabilities (receivers, voice recognizers, etc.).

OAM&P Manager Conceptual Entity 428 is the functional component that handles the operation, administration, maintenance, and provisioning functions for an SI-NE 110 and an SF-NE 112. This functionality is distributed between the SI-NE 110 and SF-NE 112.

Resource Manager Conceptual Entity 426 is the object responsible for maintaining a distributed view of the current availability of resources throughout a Switch Node 200, including all resources that directly apply to a Switch Intelligence Function 226.

Device Pool Conceptual Entity 430 represents all available external devices that may be attached to Facility Channel 414 as External Devices 424 for purposes of signaling or bearer service.

B. API Interfaces

In a preferred embodiment of the present invention, many of the interfaces are implemented as application programming interfaces (APIs). As will be apparent to one skilled in the relevant arts, other interface implementations may be employed without departing from the spirit and scope of the present invention.

Figure 5:
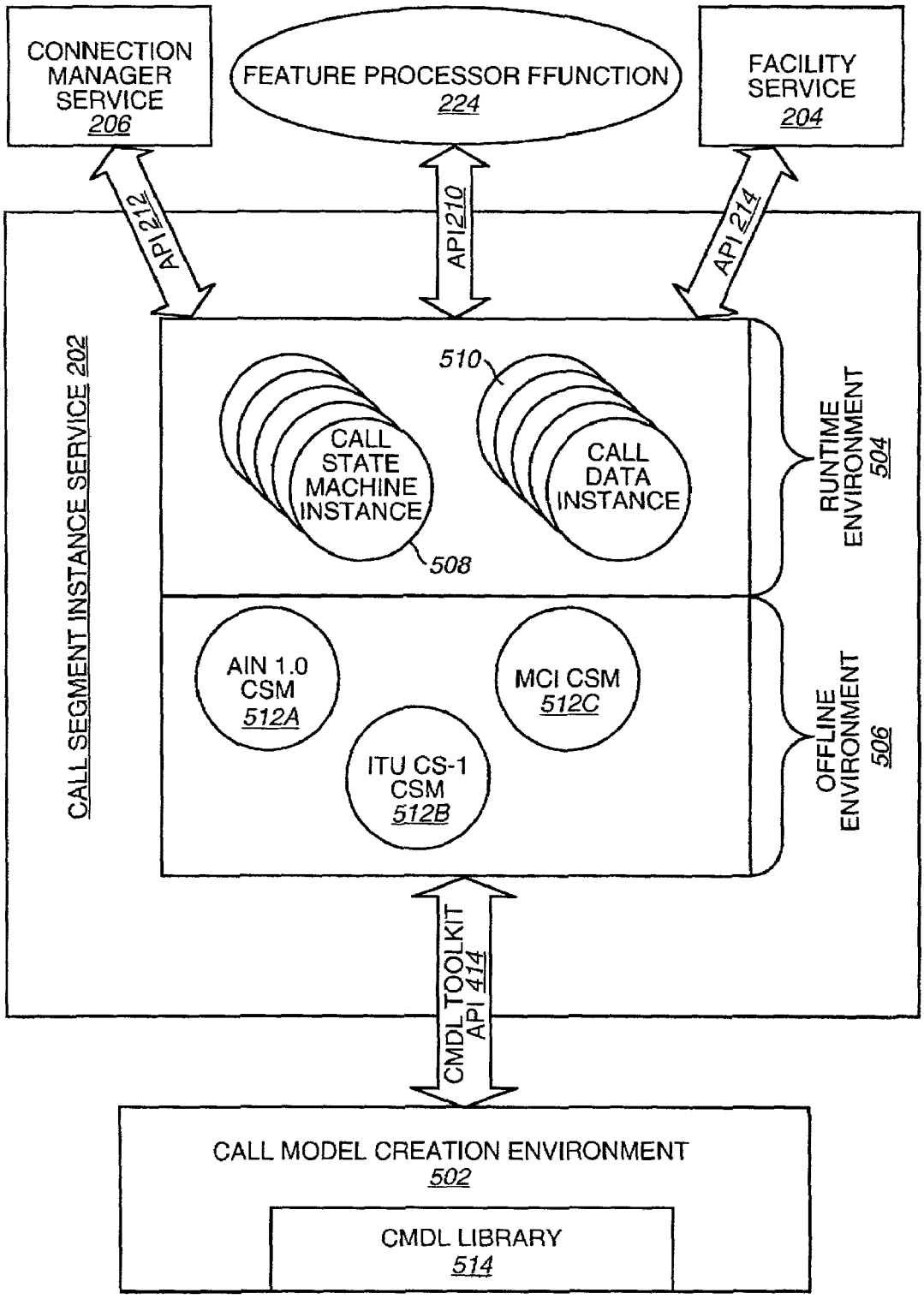
FIG. 5 is an object view of Call Segment Instance Service according to the present invention.

The capability to customize Switch Intelligence Function 226 is a hallmark of the present invention. In a preferred embodiment of the present invention, Call Segment Instance Service 202 and Facilities Service 204 are independently customizable. Thus, according to a preferred embodiment of the present invention, Call Segment Instance Service 202 and Facilities Service 204 each provide two types of APIs: programming APIs and control APIs. FIG. 5 is an object view of Call Segment Instance Service 202, and is useful in explaining the difference between these two types of APIs. As will be apparent to one skilled in the relevant art, this discussion [is] applies in a similar fashion to Facilities Service 204.

A significant advantage of the provision of standard control APIs is that Call Segment Instance Service 202, Facilities Service 204, Connection Manager Service 206, and Switch Fabric Proxy Service 208 may each be provided by different vendors.

1. Programming (Non-Instance) APIs

In FIG. 5, Call Segment Instance Service 202 is depicted as being comprised of two environments: Offline Environment 506 and Runtime Environment 504. Offline Environment 506 is accessed by Call Model Creation Environment 502 via call Model Definition Language (CMDL) Toolkit API 414. CMDL Toolkit API 414 is a programming (non-instance) API. Facility Service 204 has a similar toolkit interface. Call Model Creation Environment 502 is based on the service creation environment concept. Facility Service 204 has a similar service creation environment.

These API interfaces permit element behaviors to be redefined to facilitate the creation of new services, either within the switching system or within an associated feature engine. CMDL Toolkit API 414 can be employed to create class definitions for aspects of the call model, such as Call State Machines 512, prior to runtime. For example, these class definitions may include a Call State Machine 512A for AIN 1.0, a Call State Machine 512B for ITU CS-1, and a Call State Machine 512C for an MCI call state machine. Call Segment Instance Service 202 creates instances 508 of the defined call state machines, and maintains call data instances 510 in response to requests from Feature Processor Function 224 received via control APIs 210, 212, and 214. The programming API for Facility Service 204 can be employed in a similar fashion, for example, to create a Signaling State Machine.

Call Model Creation Environment 502 provides a CMDL Library 514 of the states, events, and atomics which make up the CMDL. In a state machine, an atomic is a non-controlling single step action (for example, a procedure call). An event is a notification to the Switch Fabric Function of activity.

2. Control (Instance) APIs

In operation, the Runtime Environment 504 of Call Segment Instance Service 202 interacts with Feature Processor Function 224, Connection Manager Service 206, and Facility Service 204 via control APIs 210, 212, and 214, respectively, to perform call processing. Call Segment Instance Service 202 instantiates (i.e., creates), for example, Call State Machine Instances 508 and Call Data Instances 510 in response to requests for service.

Because Connection Manager Service 206 and Facility Service 204 provide standard control APIs, the provider of Switch Intelligence Function 226 has the ability to "mix and match" components within the Switch Intelligence Function, allowing a "buy/build" decision on a case by case basis.

III. An Example: Three-Way Call

As an example of the operation of the present invention according to a preferred embodiment, consider a three-way call, which is a specific type of a conference call. This example will be described with reference to FIG. 3. The three way call is a feature which has been created for, and is running on, a Feature Processor 114.

A three-way call is placed via an External Function 228 having both bearer and signaling components (e.g., a LEC or PBX). In response, the signaling component of External Function 228 provides a signaling request to Switch Fabric Function 222, which maps the request to Switch Intelligence Function 226. Facility Service 204 performs certain signaling processing (perfoming early address determination, unpacking various protocols into a common protocol, parsing of the common protocol) and passes the event to Call Segment Instance Service 202, which instantiates a Call Segment Instance 306A, including a Call State Machine Instance 508, to represent call half 320A.

Call Segment Instance Service 202 informs Connection Manager 206 of the status of Active Connector 308A and any Passive Connectors 310 (there are none yet, as Party A is still the only party to the call). In response, Connection Manager Service 206 directs Switch Fabric Function 222 (via Switch Fabric Proxy Service 208) to make the required physical connections.

Because Party A is requesting a feature (the three-way call), Call Segment Instance Service 202 triggers Feature Processor Function 224. In response, Feature Processor Function 224 provides a command, via API 210, to Call Segment Instance Service 202, to add Parties B and C to the call. In response, Call Segment Instance Service 202 instantiates Call Segment Instances 306B and 306C, instructs Facility Service 204 to instantiate Facility Instances 304B and 304C, and instructs Connection Manager Service 206 to create Passive Connectors 310A and 310B and Active Connectors 308B and 308C. Connection Manager Service 206 directs Switch Fabric Function 222 (via Switch Fabric Proxy Service 208) to make the necessary physical connections, thus creating the three-way call.

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An apparatus for decentralizing communication services in a telecommunications system, comprising:

[a switch fabric which provides bearer functions;]

a switch intelligence which provides control functions for [said] *a* switch fabric, said switch intelligence *being* logically separated from said switch fabric *and being implemented in a separate network element from said switch fabric, the switch intelligence being configured to:*

*process information received from the switch fabric, the information comprising a facility related event associated with a call,*

*maintain a call state associated with completing the call in accordance with a call model, the call model indicating how the information will be processed,*

*identify at least one point in call associated with completing the call, and*

*forward a request for a telecommunications function in response to the identified at least one point in call;* a switch fabric proxy service for providing a normalized interface between said switch fabric and said switch intelligence for [all] communications involving said switch fabric [by interfacing to said switch fabric with any one of a plurality of application program interfaces] and interfacing to said switch intelligence with a uniform application program interface, *wherein the normalized interface comprises any one of a plurality of vendor-specific interfaces associated with the switch fabric*; and

*a* feature processor, said feature processor *configured to:*

*receive the request for the telecommunications function, and*

[executing at least one] *execute the* telecommunications function[, for interacting with said switch intelligence to thereby provide said telecommunications feature] *in response to the received request*.

2. The [system] *apparatus* of claim 1, wherein said switch intelligence [further] comprises:

[at least one facility instance instantiated by a] facility service [using a facility model, said facility instance representing the] *logic configured to represent* bearer and signaling facilities of a party to [a] *the* call, for interacting with said switch fabric proxy service to communicate with said switch fabric, *the facility service logic configured to receive the facility related event and perform protocol processing on the information received from the switch fabric, wherein the facility related event comprises at least one of an off-hook indication, an on-hook indication or a wink.*

3. The [system] *apparatus* of claim 2, wherein said switch intelligence further comprises:

[a] connection manager [service representing the connectors for said party to a call for interacting with said switch fabric proxy service to communicate with said switch fabric] *logic configured to forward connection information to the switch fabric, the connection information instructing the switch to establish physical connections to complete the call.*

4. The [system] *apparatus* of claim [3] *1*, wherein said switch intelligence [further] comprises:

[at least one call segment instance instantiated by a] call segment [instance service] *logic configured to:*

*represent a status of at least two call halves associated with completing the call in accordance with the call model, and*

[using a call model, said call segment instance representing the call logic and call data for said party to a call, for interacting with said feature processor, said connection manager service, and said facility instance] *perform call processing for each of the at least two call halves*.

5. The [system] *apparatus* of claim [2] *1*, wherein said switch intelligence [further] comprises:

a [first] call processing creation environment, said [first] call processing creation environment interacting with said [facility service,] *switch intelligence* for modifying said [facility] *call* model *without modifying the switch fabric*.

6. The [system] *apparatus* of claim 4, wherein said switch intelligence further comprises:

a [second] call processing creation environment, said [second] call processing creation environment interacting with said call segment [instance service] *logic*, for modifying said call model.

7. The [system] *apparatus* of claim 2, wherein said switch intelligence further comprises:

a [third] call processing creation environment, said [third] call processing creation environment interacting with said facility service[,] *logic* for creating new facility models.

8. The [system] *apparatus* of claim 4, wherein said switch intelligence further comprises:

a [fourth] call processing creation environment, said [fourth] call processing creation environment interacting with said call segment [instance service] *logic*, for creating new call models.

*9. An apparatus comprising:*

*a switch-fabric proxy service for providing a normalized interface between a switch fabric and a switch intelligence for communications involving said switch fabric by interfacing to said switch fabric with any one of a plurality of application programming interfaces, wherein the switch fabric and the switch intelligence are implemented in separate network elements; and*

*the switch intelligence, the switch intelligence being configured to:*

*receive notification of a facility related event associated with a call from the switch fabric, wherein the facility related event is received from the switch fabric as raw or unprocessed data which is associated with user activity at a telephone device,*

*perform call processing in accordance with a call model and in response to the notification,*

*maintain a status of at least two call halves associated with completing the call in accordance with the call model, and*

*direct the switch fabric to make physical connections for each of the at least two call halves to complete the call.*

*10. An apparatus according to claim 9, wherein said plurality of application programming interfaces is at least one of vendor-specific or switch-fabric-specific.*

*11. An apparatus comprising:*

*switch intelligence configured to:*

*receive notification of a facility related event associated with a call from a switch fabric, wherein the switch intelligence is implemented in a separate network element from a network element implementing the switch fabric and the facility related event is received from the switch fabric as raw or unprocessed data which is associated with user activity at a telephone device,*

*execute a call state machine, the call state machine being responsive to the notification of the facility related event and representing processing of the call as at least one call segment, wherein the at least one call segment corresponds to a call half,*

*provide an association between the at least one call segment and at least one physical device associated with completing the call, and*

*provide connection information to the switch fabric based on the association.*

*12. An apparatus according to claim 11, wherein said network element implementing the switch intelligence is physically separated from said network element implementing the switch fabric and is coupled to the network element implementing the switch fabric via a communications network.*

*13. An apparatus according to claim 11, wherein the network element implementing said switch intelligence is logically separated from the network element implementing said switch fabric.*

*14. An apparatus according to claim 11, further comprising:*

*a switch-fabric proxy service for providing a normalized interface between said switch fabric and the switch intelligence for communications involving said switch fabric, wherein said switch-fabric proxy service interfaces to said switch fabric with any one of a plurality of application programming interfaces and interfaces to said switch intelligence with a uniform application programming interface.*

*15. An apparatus according to claim 14 wherein each of said plurality of application programming interfaces comprises at least one of a vendor-specific application programming interface or a switch-fabric-specific application programming interface.*

*16. An apparatus according to claim 11, further comprising:*

*a switch-fabric proxy service for providing a normalized interface between said switch fabric and the switch intelligence for communications involving said switch fabric, wherein said switch-fabric proxy service translates switch-fabric communications into switch-intelligence communications.*

*17. An apparatus according to claim 16 wherein said switch-fabric communications are at least one of vendor-specific or switch-fabric-specific.*

*18. An apparatus according to claim 11, further comprising:*

*a switch-fabric proxy service for providing a normalized interface between said switch fabric and the switch intelligence for communications involving said switch fabric, wherein said switch-fabric proxy service translates switch-intelligence communications into switch-fabric communications.*

*19. An apparatus according to claim 18, wherein said switch-fabric communications are at least one of vendor-specific or switch-fabric-specific.*

*20. An apparatus according to claim 11, further comprising:*

*a switch-fabric proxy service for providing a normalized interface between said switch fabric and the switch intelligence for communications involving said switch fabric, wherein said switch-fabric proxy service translates switch-fabric communications into communications defined according to a uniform interface.*

*21. An apparatus according to claim 11, further comprising:*

*a switch-fabric proxy service for providing a normalized interface between said switch fabric and a switch intelligence for communications involving said switch fabric, wherein said switch-fabric proxy service translates communications defined according to a uniform interface into switch-fabric communications.*

*22. The apparatus of claim 11, wherein the facility related event comprises at least one of on-hook, off-hook or wink.*

*23. An apparatus comprising:*

*a switch intelligence for providing control functions to at least one switch fabric and being implemented in a network element separate from the at least one switch fabric, the switch intelligence comprising:*

*processing logic configured to:*

*receive information from the at least one switch fabric, the information including a facility related event associated with a call, wherein the facility related event is received from the at least one switch fabric as raw or unprocessed data which is associated with user activity at a telephone device,*

*process the received information,*

*maintain call states in accordance with a call model for at least one party involved in the call, and*

*provide connection information to the at least one switch fabric for completing the call.*

*24. An apparatus according to claim 23 wherein said switch intelligence is one of logically separated or physically separated from said at least one switch fabric, the processing logic being further configured to:*

*identify at least one point in the call where a telecommunications function is required, and*

*send a request for the telecommunications function to a processor in response to the identified at least one point in the call.*

*25. An apparatus according to claim 24, further comprising:*

*a processor executing the telecommunications function in response to the request.*

*26. An apparatus according to claim 23, further comprising:*

*a switch fabric proxy for providing a plurality of application programming interfaces for communications between the at least one switch fabric and the switch intelligence, wherein each of said plurality of application programming interfaces comprises at least one of a vendor-specific application programming interface or a switch-fabric-specific application programming interface.*

*27. An apparatus according to claim 23 wherein said switch intelligence provides control functions to a plurality of switch fabrics.*

*28. An apparatus according to claim 23 wherein said switch intelligence further comprises at least one of a facility service, a call connection manager service, or a call segment instance service.*

*29. An apparatus according to claim 28 wherein said at least one of a facility service, a call connection manager service, or a call segment instance service comprises a call segment instance service, the call segment instance service configured to maintain the call states for the at least one party involved in the call.*

*30. The apparatus of claim 23, wherein the facility related event comprises at least one of on-hook, off-hook or wink.*

*31. An apparatus, comprising:*

*means for receiving switch-fabric communications from a switch-fabric the means for receiving being implemented in a network element separate from the switch-fabric, and the switch-fabric communications including a facility related event associated with a call, wherein the facility related event is received from the switch-fabric as raw or unprocessed data which is associated with user activity at a telephone device;*

*means for processing the switch-fabric communications, wherein the means for processing is configured to maintain call states in accordance with a call model for at least one party involved in the call and generate connection information for completing the call; and*

*means for translating the connection information into switch-fabric communications for use by a switch fabric.*

*32. An apparatus, comprising:*

*means for translating switch-fabric communications into communications defined according to a uniform switch-intelligence interface, the means for translating being implemented in a network separate from a switch-fabric;*

*means for processing the switch-fabric communications comprising facility related event information associated with a call, wherein the facility related event is received from the switch-fabric as raw or unprocessed data which is associated with user activity at a telephone device, the means for processing being configured to:*

*maintain call states for at least one party involved in the call in accordance with a call model, and*

*execute the call model to generate connection information for completing the call; and*

*means for translating the communications defined according to the uniform switch-intelligence interface into switch-fabric communications.*

*33. The apparatus according to claim 32, further comprising:*

*means for translating communications defined according to the uniform interface into switch-intelligence communications; and*

*means for translating switch-intelligence communications into communications defined according to a uniform interface.*

*34. An apparatus comprising:*

*a switch-fabric proxy service that is capable of at least one of translating switch-fabric communications into switch-intelligence communications, translating the switch-intelligence communications into the switch-fabric communications, translating the switch-fabric communications into communications defined according to a uniform switch-intelligence interface, or translating the communications defined according to a uniform switch-intelligence interface into the switch-fabric communications; and*

*a switch intelligence implemented in at least one network element, the at least one network element being a separate network element from a network element implementing a switch-fabric that is coupled to the switch-fabric proxy service, the switch intelligence being configured to:*

*receive notification of a facility related event associated with a call from a switch-fabric, wherein the facility related event is received from the switch-fabric as raw or unprocessed data which is associated with user activity at a telephone device,*

*execute a call model to generate connection information for completing the call in response to the notification,*

*maintain call states for at least one party involved in the call in accordance with the call model, and*

*forward the connection information to the switch-fabric via the switch-fabric proxy service.*

*35. An apparatus according to claim 34, wherein said switch-fabric proxy service includes a normalized interface between the switch fabric and the switch intelligence.*

*36. The apparatus according to claim 34, wherein said at least one network element implementing the switch intelligence is one of logically separated or physically separated from the network element implementing the switch fabric and is coupled to the network element implementing the switch fabric via a communications network.*

*37. An apparatus according to claim 34, wherein the switch fabric includes said switch-fabric proxy service.*

*38. An apparatus according to claim 34, wherein the switch intelligence is further configured to:*

*maintain the call model, the call model affecting how calls received by the switch fabric will be processed and wherein the call model is modifiable at the switch intelligence without modifying the switch fabric.*

*39. An apparatus according to claim 34, wherein said switch-fabric proxy service includes an application programming interface for interfacing with the switch fabric.*

*40. An apparatus according to claim 37, wherein said application programming interface is at least one of a vendor-specific interface or a switch-fabric-specific interface.*

*41. An apparatus according to claim 34, wherein said switch-fabric proxy service includes an application programming interface for interfacing with the switch-intelligence.*

*42. An apparatus comprising:*

*a switch intelligence network element for controlling a switch fabric network element, the switch intelligence network element being implemented in a network element separate from the switch fabric network element and wherein said switch intelligence network element comprises:*

*processing logic configured to:*

*receive notification information comprising a facility related event associated with a call from the switch fabric network element, wherein the facility related event is received from the switch fabric network*

*element as raw or unprocessed data which is associated with user activity at a telephone device, and*

*perform call half processing for at least one party associated with the call in response to the notification information and in accordance with a call model.*

*43. An apparatus according to claim 42, wherein said processing logic is further configured to:*

*perform the call half processing in accordance with a call model, the call model representing at least one of an Advanced Intelligent Network (AIN) call model, an International Telecommunications Union (ITU) call model or a call model created by a service provider.*

*44. The apparatus according to claim 42, wherein said switch intelligence network element includes at least one of a first application programming interface communicable with a switch-fabric proxy service or a second application programming interface communicable with a feature processor that executes at least one telecommunications function.*

*45. The apparatus according to claim 42, further comprising at least one application programming interface communicable between at least one of a facility service, a call connection manager service, or a call segment instance service and another of said at least one of a facility service, a call connection manager service, or a call segment instance service.*

*46. An apparatus comprising:*

*a feature processor for executing at least one telecommunications function; and*

*switch intelligence configured to:*

*receive facility related event data associated with a call from a switch fabric, wherein the facility related event is received from the switch fabric as raw or unprocessed data which is associated with user activity at a telephone device,*

*perform call half processing associated with at least one party to the call in response to the facility related event data and in accordance with a call model, and*

*provide connection information to an entity that received the call, wherein the connection information identifies physical connections to complete the call, wherein the switch intelligence is implemented in at least one network element, the at least one network element being a separate network element from the entity that received the call.*

*47. A non-transitory apparatus for controlling a switch fabric, the apparatus being implemented in at least one network element, the at least one network element being separate from the switch fabric, the apparatus comprising:*

*logic for processing a facility related event received from the switch fabric in accordance with a call model, wherein the facility related event is received from the switch fabric as raw or unprocessed data which is associated with user activity at a telephone device,*

*logic for performing call half processing for at least one party involved in the call in response to the facility related event and in accordance with the call model, and*

*logic for forwarding connection information to the at least one switch fabric.*

*48. The apparatus of claim 47, further comprising:*

*interface logic including a first interface for communications between the apparatus and the switch fabric.*

*49. An apparatus, comprising:*

*a call completion device for providing bearer functions, said call completion device performing communications with a switch intelligence that is implemented in a separate network element from said call completion device, wherein the call completion device comprises a switch fabric, the call completion device being configured to:*

*forward a facility related event associated with a call to the switch intelligence, wherein the facility related event is received from the call completion device as raw or unprocessed data which is associated with user activity at a telephone device, and*

*receive bearer connection information from the switch intelligence in accordance with a call model executed by the switch intelligence.*

*50. The apparatus of claim 49, wherein the switch intelligence comprises a call state model, and wherein the call completion device communicates with the switch intelligence to affect a call state.*

*51. The apparatus of claim 50, wherein the call state is represented in the call state model.*

*52. The apparatus of claim 49, further comprising:*

*a switch fabric proxy service for providing an application programming interface for communications between the call completion device and the switch intelligence.*

*53. A non-transitory apparatus, comprising:*

*logic configured to receive information from a switch fabric that received a request for making a call, the logic being implemented in a network element separate from the switch fabric, the information comprising a facility related event, wherein the facility related event is received from the switch fabric as raw or unprocessed data which is associated with user activity at a telephone device;*

*logic configured to perform call half processing for at least a first party or a second party associated with the call in response to the facility related event and in accordance with a call model;*

*logic configured to generate connection information for the entity that received the request; and*

*logic configured to forward the connection information to the entity that received the request.*

*54. The apparatus of claim 53, wherein the apparatus is implemented in a network element that is separate from the entity that received the request.*

*55. The apparatus of claim 53, wherein the logic configured to perform call half processing maintains call states associated with completing the call in accordance with a call model.*

*56. The apparatus of claim 31, wherein the facility related event comprises at least one of on-hook, off-hook or wink.*

*57. The apparatus of claim 42, wherein the facility related event comprises at least one of on-hook, off-hook or wink.*

*58. The apparatus of claim 47, wherein the facility related event comprises at least one of on-hook, off-hook or wink.*

* * * * *